United States Patent
Paronen et al.

(10) Patent No.: US 11,454,549 B2
(45) Date of Patent: Sep. 27, 2022

(54) MEASUREMENT ADAPTER AND MEASUREMENT DEVICE COMPRISING SUCH ADAPTER

(71) Applicant: Yrkeshögskolan Arcada Ab, Helsinki (FI)

(72) Inventors: Mikael Paronen, Helsinki (FI); Stuart Buddle, Helsinki (FI)

(73) Assignee: Mikael Paronen, Espoo (FI)

( * ) Notice: Subject to any disclaimer, the term of this patent is extended or adjusted under 35 U.S.C. 154(b) by 299 days.

(21) Appl. No.: 16/493,774

(22) PCT Filed: Mar. 14, 2018

(86) PCT No.: PCT/FI2018/050184
§ 371 (c)(1),
(2) Date: Sep. 13, 2019

(87) PCT Pub. No.: WO2018/167367
PCT Pub. Date: Sep. 20, 2018

(65) Prior Publication Data
US 2020/0064204 A1 Feb. 27, 2020

(30) Foreign Application Priority Data
Mar. 14, 2017 (FI) .................................... 20175225

(51) Int. Cl.
| | |
|---|---|
| *G01K 17/00* | (2006.01) |
| *G01K 1/143* | (2021.01) |
| *G01K 1/16* | (2006.01) |
| *G01K 17/20* | (2006.01) |
| *G01N 25/18* | (2006.01) |

(52) U.S. Cl.
CPC ............. *G01K 1/143* (2013.01); *G01K 1/165* (2013.01); *G01K 17/20* (2013.01); *G01N 25/18* (2013.01)

(58) Field of Classification Search
CPC combination set(s) only.
See application file for complete search history.

(56) References Cited

U.S. PATENT DOCUMENTS

| | | |
|---|---|---|
| 3,915,241 A | 10/1975 | Bieri |
| 5,816,706 A | 10/1998 | Heikkilä et al. |
| (Continued) | | |

FOREIGN PATENT DOCUMENTS

| | | |
|---|---|---|
| CN | 2476020 Y | 2/2002 |
| CN | 103321231 A | 9/2013 |
| (Continued) | | |

*Primary Examiner* — Lisa M Caputo
*Assistant Examiner* — Nasir U. Ahmed
(74) *Attorney, Agent, or Firm* — Laine IP Oy

(57) ABSTRACT

The invention relates to heat flow measurements. In particular, the invention relates to a surface adapter (10A, 10B, 100) for a heat flow measurement device, a device comprising such adapter (10A, 10B, 100) and a method of measuring heat flow. The adapter is comprises a rim (12) positionable around a measurement head (20) of a heat flux measurement device, the rim (12) being at least partly made of resilient material capable of adapting in shape to uneven surfaces for thermally insulating the measurement head (20) from its surroundings. The invention allows for more accurate thermal flow measurements.

19 Claims, 4 Drawing Sheets

(56) References Cited

U.S. PATENT DOCUMENTS

| | | | | |
|---|---|---|---|---|
| 6,941,853 B2* | 9/2005 | Hembree | ............ | F04B 43/0054 |
| | | | | 92/98 R |
| 2001/0017880 A1* | 8/2001 | Beerwerth | .............. | G01J 5/049 |
| | | | | 374/158 |
| 2010/0292605 A1 | 11/2010 | Grassl et al. | | |
| 2011/0172750 A1* | 7/2011 | Cassidy | ................. | A61F 7/007 |
| | | | | 607/108 |

FOREIGN PATENT DOCUMENTS

| | | | | |
|---|---|---|---|---|
| CN | 104977673 A | * | 10/2015 | ........... G02B 6/4436 |
| DE | 2724846 A1 | | 12/1978 | |
| JP | H05332851 A | | 12/1993 | |
| WO | WO2010116297 A1 | | 10/2010 | |
| WO | WO2012042759 A1 | | 4/2012 | |
| WO | WO2013153251 A1 | | 10/2013 | |
| WO | WO2017031129 A1 | | 2/2017 | |

\* cited by examiner

MEASUREMENT ADAPTER AND MEASUREMENT DEVICE COMPRISING SUCH ADAPTER

FIELD OF THE INVENTION

The invention relates to heat flow measurements. In particular, the invention relates to measurement devices suitable for measuring heat flow through objects, such as construction elements. The invention also relates to accessories usable with such devices and measurements and a heat flow measurement method.

BACKGROUND OF THE INVENTION

Determining heat flow through a construction element, such as a wall, ceiling or floor, is important in construction industry. The magnitude of heat flow is typically described by an overall heat transfer coefficient, or so-called U-value. In addition to theoretical calculations, it is often necessary to be able to measure the actual rate of heat flow from existing, real structures.

WO 2013/153251 describes one method and apparatus for determining heat flux by measurements. In the method, at least two temperature sensors are placed against the surface of the construction to be investigated. A first temperature sensor is thermally insulated from a second temperature sensor in such a way that the temperature of the construction is affected by the heat flow to a larger extent than the temperature which is sensed by the second temperature sensor. The temperature difference between the first and the second sensor is determined. By thereafter supplying heat to the first temperature sensor, or by dissipating heat from it, and based on the amount of the supplied or the dissipated heat, it is possible to determine the heat flow through the construction. Other techniques for measuring heat flows are disclosed in DE 27 24 846, JPH 05332851 and CN 2476020Y.

Surfaces of real, existing constructions are often uneven, which causes the thermal contact between the measurement device and the surface to be non-optimal. This makes accurate temperature measurements challenging and causes measurement errors. Thus, there is a need for improvements in heat flow measurement technology.

SUMMARY OF THE INVENTION

It is an aim of the invention to provide a solution for improving accuracy of heat flux measurements on real surfaces and in particular rough surfaces.

A particular aim is to provide a solution that can be easily used with existing heat flux measurement devices to improve their reliability when used for measuring real construction element surfaces having varying surface structures.

One aim is to provide a novel measurement device suitable for such use and a novel measurement method.

The invention is based on the idea of providing, preferably in the form of an adapter mountable on a heat flow measurement device, an instrument that reduces heat flux between a measurement zone of the heat flow measurement device and its surroundings.

This is achieved by providing a rim positionable around a measurement head of a heat flux measurement device, the rim being made at least partly of resilient, such as elastic, and, preferably, thermally insulating material capable of adapting in shape to uneven surfaces for thermally insulating the measurement head from its surroundings.

Thus, in one aspect, the invention provides a measurement device comprising a measurement head having a first temperature sensor for measuring the temperature of a surface and a heating element supplying heat to the surface measured. Further, there is provided an adapter arranged essentially around the measurement head for fitting, due to the elasticity of the rim, the measurement head against the surface to be measured. Thus the adapter seals the measurement zone defined by the measurement head, the rim of the adapter and the surface.

Finally, the invention provides a novel method for measuring heat flow through a surface, the method comprising
  providing a measurement device as herein described,
  positioning the measurement head against the surface,
  pressing the measurement head against the surface such that the adapter is at least partly compressed and deformed so as to increase thermal insulation, in particular in the lateral direction, of the measurement head from its surroundings outside the rim,
  providing heat to the surface to be measured using the heating element,
  reading temperature values of the surface using the first temperature sensor, and, optionally, the second temperature sensor, and
  determining the heat flow using the indoor and outdoor temperature values and supplied heat in steady state.

In a typical setup, the indoor temperature and heating power are defined by the instrument, whereas the outdoor temperature can be provided using external means.

More specifically, the present adapter is characterized by what is stated in the characterizing part of claim 1.

The measurement device and method according to the invention are characterized by what is stated in the characterizing parts of claims 13 and 16, respectively.

The invention provides considerable benefits. The resilient rim adapts the measurement head of the measurement device tightly against the surface of the construction to be measured, whereby the measurement zone is thermally isolated from the air space outside of it. That is, the air layer remaining between the measurement head of device and the surface remains in place.

The adapter, being mainly open in front of the measurement head, is very lightweight and adds very little to the total heat capacity of the measurement equipment. Thus, measurement errors caused by the equipment itself are minimized.

Particular advantages are gained on rugged or bumpy surfaces, such as plastered surfaces, concrete surfaces, brick surfaces, natural wood surfaces and decorated interior surfaces, to mention some examples. Therefore, any heat provided to the measurement zone, typically using heating element of the measurement device, is more precisely determined. This makes the measurements more precise since there is no or at least less convection of air from or to the air space between the measurement head. For the abovementioned reasons, the invention suits well for measurement of existing building elements, in particular walls, floors and ceiling of buildings and various positions and parts found therein.

The dependent claims are targeted to selected embodiments of the invention.

In some embodiments, the rim comprises a collar made of first material and a seal made of second, resilient, material. The seal, which can be made of foamed material, ensures tight fitting of the rim towards the surface, whereby the collar keeps the rim in shape and positions the adapter to the measurement device. The first material can be either resilient or nonresilient, as long as the seal extends on the front side of the collar such that it can be tightly compressed against the surface. Typically, the collar is made of self-supporting material that keeps the adapter in shape before, during and after compression.

In some embodiments, the rim comprises a first thermal contact pad arranged inside the rim and supported by the rim by one or more first support members, in particular elongated support members arranged between the rim and the pad. The thermal contact pad can be aligned with a temperature sensor of the measurement device so that not only improved thermal isolation, but also good thermal contact between the sensor and the surface is achieved, when the device is pressed against the surface.

In some embodiments, the adapter comprises a second thermal contact pad arranged outside the rim and supported by the rim by one or more second support members. The second contact pad can be aligned with a second temperature sensor, a reference sensor, of the heat flow measurement device so that it is in good contact with the surface as well. The invention is particularly well suited for surfaces with unevenness of at least 1 mm, typically 1-5 mm, such as 1-2.5 mm, in the direction perpendicular to the plane of the surface, for example surfaces having a maximum peak-to-valley height of 1-2.5 mm and minimum peak-to-peak distance of 1-5 mm. Such roughness is typical for example on plastered surfaces, concrete surfaces, brick surfaces, natural wood surfaces and decorated interior surfaces.

The adapter can be either factory mounted or separately mountable (retrofittable) on the measurement device.

These and other embodiment and advantages thereof are discussed in more detail with reference to the attached drawings.

DETAILED DESCRIPTION OF EMBODIMENTS

The term "front" (in e.g. front surface or front side) refers to the direction of the measurement device facing the surface measured. The term "lateral" refers to in-plane directions parallel to the surface.

The term "measurement head" refers to the portion of the measurement device comprising necessary means, in particular a temperature sensor and a heating element, to supply heat to the surface measured in order to conduct the heat flow measurement. A "measurement zone" remains under the measurement head, when placed against a construction to be measured.

The term "resilient material" covers materials, which deform locally under compression and which retake their original shape after the compression. In particular, the term covers materials that are characterized as elastic, such as elastic polymer materials.

"Sealing" in the present context essentially means improving air tightness.

Figure 1A:
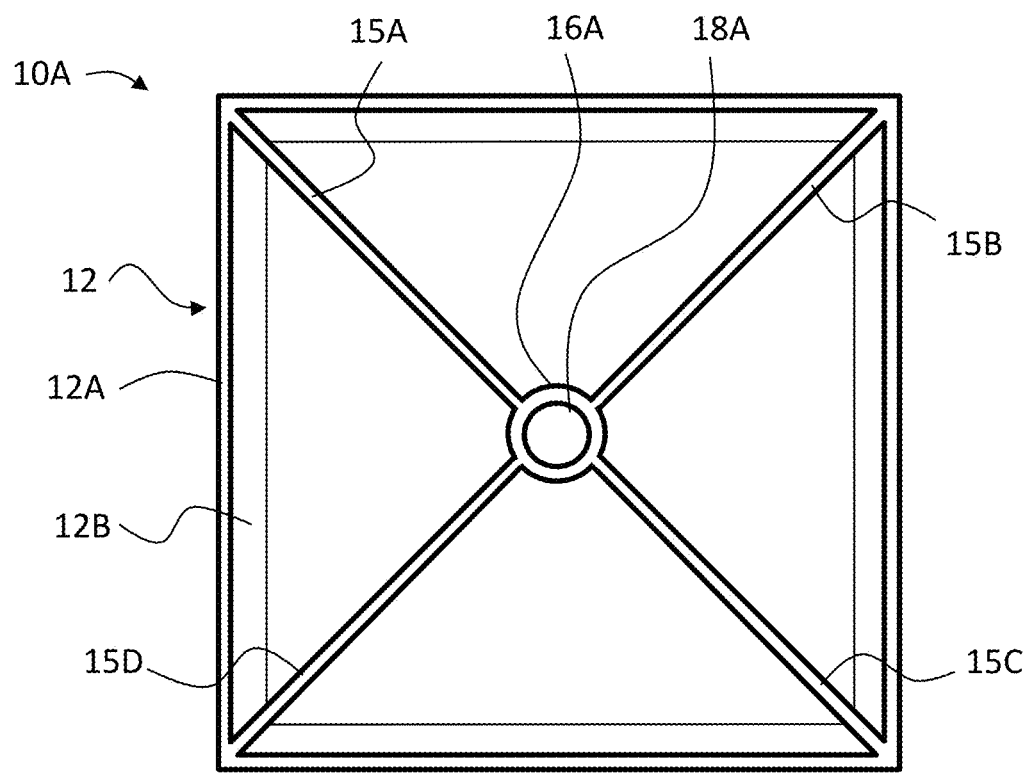
FIGS. 1A and 1B show an adapter according to one embodiment of the invention, in planes parallel and normal to the surface to be measured, respectively.
Figure 1B:
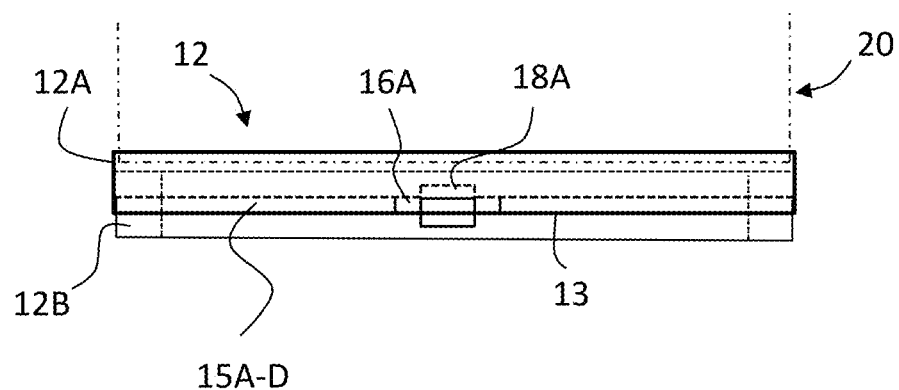

FIGS. 1A and 1B and illustrate an adapter 10A comprising a rim 12 and thermal first contact pad 16A arranged inside the rim 12. In this example, the rim 12 is square shaped, but it can take any other shape, such as a rectangular, circular, elliptical or some irregular shape, depending on the geometry of the measurement head the adapter 10A is used with. Regardless of the shape, the rim typically forms a closed loop in the plane of the surface to be measured.

The rim 12 comprises a collar 12A, which form an outer layer of the rim 12, and a seal 12B, which is placed on the inner surface of the collar 12A, which faces the measurement head. The seal 12B has a generally similar shape with the collar 12A. The collar 12A is shaped so as to attach and position the adapter to the measurement device. The seal 12B serves to provide thermal insulation in the lateral direction upon compression of the seal. According to one embodiment, the rim 12 is entirely made of resilient materials. This helps not only tight fitting of the rim 12 against the building element surface to be measured, but also tight fitting of the rim 12 around the measurement head. The rim 12 can, for example, be partly fitted around the casing of the measurement device such that one part of the rim 12 extends on the front side of the device towards the surface. Alternatively or in addition to that, the rim 12 may fit into a groove arranged around the measurement head on the front surface or lateral surfaces of the device. In all configurations, the rim encircles the measurement zone of the device, which is located between the measurement head and the surface to be measured.

The collar 12A can be made of first material and the seal 12B of second resilient material different from the first material. For example, the collar 12A can be made of non-porous material, such as polymer, whereas the seal 12B can be made of porous resilient material, such as foamed polymer, in particular foamed plastic or foam rubber. In one embodiment, the collar 12A is made of rigid material, whereby only the seal 12B, arranged to the very front of the rim, adapts to the surface structure.

The rim 12 is shaped such that at least a portion of it, when inserted on the measurement device, extends on the front side of the measurement head. When the rim 12 is pressed against the surface, it adapts to the irregularities of the surface and closes the measurement zone in front of the device. Typically, the frontal edge 13 of the rim 12, i.e. the seal 12B and optionally the collar 12A, if made of resilient material, is located most front such that it touches the surface first, potentially apart from optional thermal contact pad or pads discussed below in more detail, which may also be located front since they are pressed against the surface as well.

In one embodiment, the collar 12A extends both on the lateral and frontal sides of the measurement device 20 (illustrated with dash-dot line in FIG. 1B), and the seal 20B is entirely located on the front side of the measurement device 20. This way the device effectively presses the seal 12B against the surface and a tight interface is formed, whereas the collar 12A keeps the seal in a correct position at the measurement device 20.

The thickness of the seal in the normal direction of the surface can be e.g. 3-10 mm, which, using foam material, allows essentially tight nestling against surfaces having peak-to-valley height differences of 1.5 to 5 mm, respectively. In a typical setup, the seal has a thickness of 3.5-7 mm, such as 5 mm, which is sufficient for most constructions.

In one embodiment, the adapter comprises a first thermal contact pad arranged inside the rim, the thermal contact pad acting as a heat-conducting bridge between the construction and a temperature sensor of the device. In this example, the first thermal contact pad 16A is located symmetrically in the very centre of the rim 12, although other locations are possible too. The pad 16A is supported to the rim 12, in particular the collar 12A thereof, by a plurality of support members 15A-D. Herein, the members 15A-D connect with the rim 12 at the corners of the rim 12, but other configurations are possible too. Also the number of members can be different. At least two, in particular at least four members allows a durable supporting structure to be implemented, while keeping the total weight of supporting material low. Apart from the support members 15A-D and the contact pad 16A, the adapter remains open in the measurement zone defined by the rim 12. This is beneficial because all extra material at the measurement zone adds to the heat capacity of the measurement equipment and may change the thermal balance of the spot to be measured and therefore cause measurement errors.

To keep the heat capacity of the adapter small, the support members 15A-D are preferably thin and elongated in shape, meaning that their length to largest transverse dimension aspect ratio is at least 10:1. Their largest transverse dimension is typically less than 2 mm.

According to one embodiment, the total mass of the one or more support members 15A-D and the pad 16A is less than 5 g, in particular less than 2 g, such as 0.2-1.5 g.

According to one embodiment, the one or more support members 15A-D and the pad 16A together form a lightweight construction inside the frame, meaning that they constitute less than 25% of the total weight of the adapter, which can be e.g. 3-30 g, in particular 4-20 g. The first thermal contact pad 16A may comprise a slab, which is integral with the one or more support members 15A-15D, an optionally integral also with the collar 12A of the rim 12. The slab may have an opening for a separate thermal bridge.

To improve the thermal conductivity of the thermal contact pad 16A and therefore the thermal coupling of the temperature sensor of the measurement device and the surface to be measured, there may be provided a contact bridge 18A made of material that has higher thermal conductivity than the rest of the pad 16A and/or the support members 15A-D. In one example, the total mass of the adapter is 3-100 g, in particular 3-10 g, of which the foam seal 12B forms 0.2-2 g, the first X-shaped support members 15A-D and their central slab form 0.2-2 g and the thermal contact bridge 18A forms 0.05-0.5 g. This way, low enough heat capacity of the thermally critical parts of the adapter is ensured for very accurate heat flow measurements.

Figure 2A:
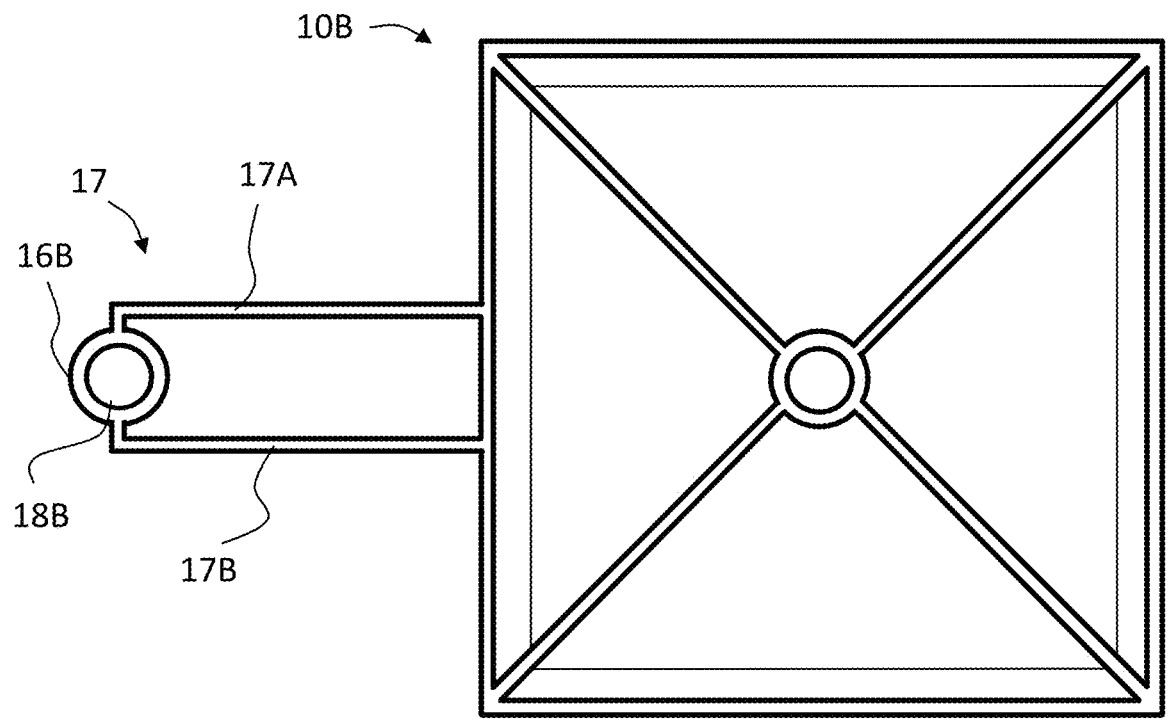
FIGS. 2A and 2B show an adapter according to another embodiment of the invention, in planes parallel and normal to the surface to be measured, respectively.
Figure 2B:
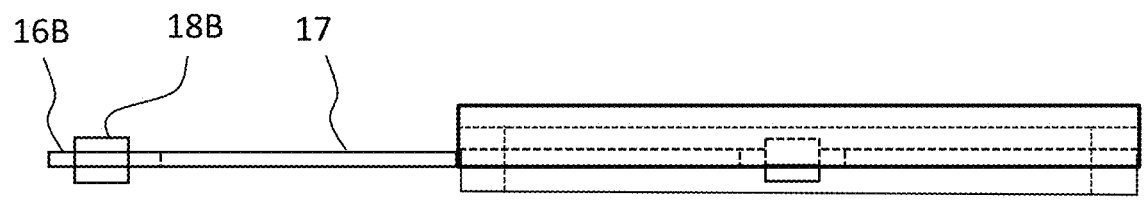

As illustrated in FIGS. 2A and 2B, according to one embodiment, the adapter comprises a second thermal contact pad 16B arranged outside the rim 12 and supported by the rim 12 by one or more second support members 17A-17B. The second pad 16B serves to couple a second temperature sensor, i.e. a reference temperature sensor located outside the main measurement zone, to the surface.

As is the case with the first thermal contact pad 16A and its support members 15A-D, also the second thermal contact pad 16B and its support members 17A-17B can be integral, i.e. constitute a unitary piece with at least part of the rim, i.e. its collar 12A. In that case, they are typically made of elastic material. Alternatively, the second thermal contact pad 16B and its support members 17A-17B constitute a separate part attached to the rim and/or the measurement device.

Alternatively, one or both of the pads 16A, 16B and their support members 15A-15D, 17A-17B can be provided as a separate structure mounted to the rim 12. For example, they can be made of non-elastic material, such as cut from a sheet of polymer, such as PLA. In one embodiment, the first thermal contact pad 16A and its support members 15A-15D is provided in the form of an X-shaped planar structure. In the crossing point of the members 15A-15D, there is preferably a zone, such as a circular zone, with a hole for mounting the contact bridge 18A such that a thermal bridge is formed therein.

Also the second thermal contact pad 16B may be provided with a contact bridge 18B in order to improve thermal contact with the surface.

The contact pads, or, if used, at least their contact bridges 18A, 18B, are preferably made of resilient thermally conductive material, such as elastic polymer, so as to maximize the thermal coupling.

The thermal conductivity of the first contact pad 16A, and, optionally, the second contact pad 16B can be improved for example by using elastic material comprising mixed therein an additive, such as metal oxide, which increases thermal conductivity of the material, in the contact bridges 18A, 18B.

The simultaneous compression of the seal 12B, optionally the collar 12A, and the thermal bridges 18A, 18B ensures good lateral thermal insulation and good thermal contact of temperature sensors of the device with the surface.

Figure 3:
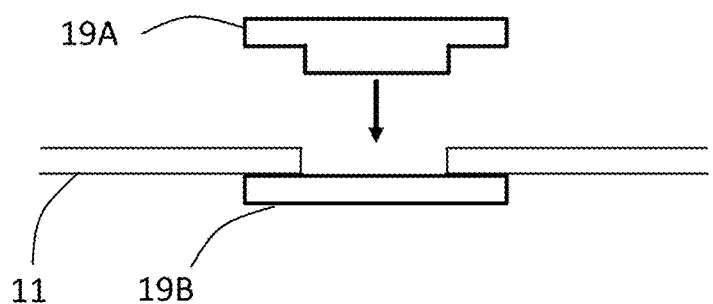
FIG. 3 illustrates exemplary mounting of a thermal contact pad to the adapter.

FIG. 3 illustrates exemplary mounting of a contact bridge to a contact pad 11. The pad 11 comprises an opening and the bridge comprises two halves 19A, 19B, which are positioned to the opening from different sides thereof and joined together to form a thermally conducting central portion to the pad 11. At least one of the halves 19A, 19B, preferably both, may contain a flange that is larger than the opening, for keeping the bridge firmly in place. Thermally conducting adhesive or paste, or for example, polysiloxane (bathroom silicone), can be used between the halves 19A, 19B.

A thermal bridge according to FIG. 3 can be manufactured for example using, measured by volume, 10-30%, such as 20% $Al_2O_3$ mixed with 70-90%, such as 80% bathroom silicone and cast separately in moulds, such as 3D printed moulds. The halves can be glued together with silicone to the thermal contact pads of the adapter. In one embodiment, apart from the metal oxide used in the bridge(s), the adapter is all-polymeric.

In one embodiment, the adapter, apart from the potential thermal contact bridges, is comprised of two integral bodies assembled together: A first resilient body, such as an elastic non-foamed polymer body, that forms the collar 12A, and optionally the support members 15A-15D, 17A-17B for the thermal contact pads 16A, 16B; and a second resilient body, such as a foamed polymer body, that forms the seal 12B. The thermal contact bridges 18A, 18B, may form separate bodies of third material that are added to the thermal contact pads 16A, 16B.

Figures 4A, 4B:
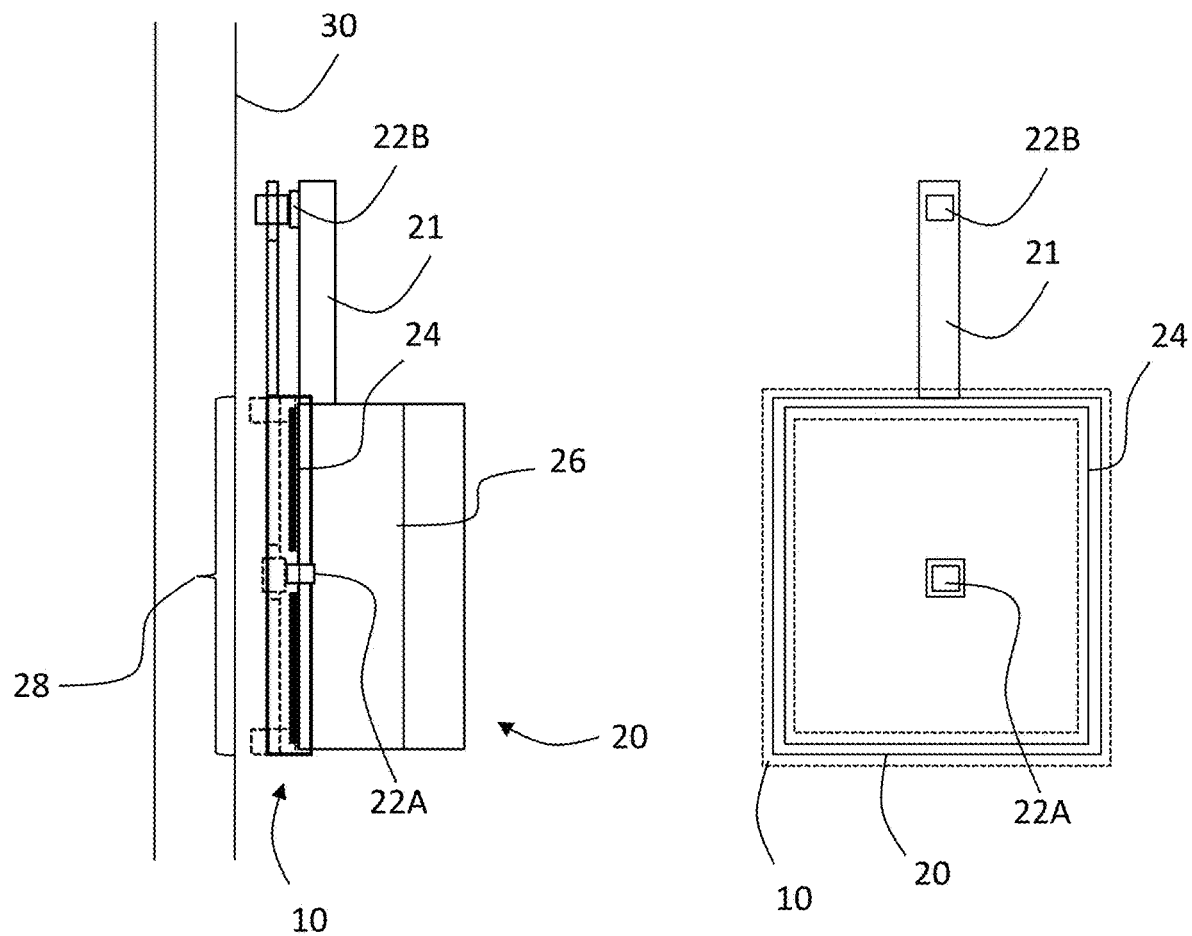
FIGS. 4A and 4B illustrate in side and front views (viewed from the surface to be measured), respectively, of a measurement device according to some aspects of the invention.

FIGS. 4A and 4B show an exemplary measurement device 20 provided with an adapter 10 as described above positioned towards a construction, herein a wall 30. The device comprises a first temperature sensor 22A which is engaged with the first thermal contact pad of the adapter 10 and a second temperature sensor 22B engaged with the second thermal contact pad of the adapter 10. Inside the adapter 10, remains also a heating element 24 of the device 20. The measurement zone 28, i.e., the main area of the wall 30, which the device thermally interacts with, is thus defined by the rim of the adapter 10.

In one embodiment, the measurement device 20 comprises two printed circuit boards first of which (not shown) containing essentially control electronics, switches and display. The second printed circuit board (not shown) contains the first temperature sensor 22A in the middle and another temperature sensor 22B attached to this printed circuit board. The front surface of the second printed circuit board—the one mounted on the measurement zone—also has a heating element 24 thereon. Insulation material 26 is found between the printed circuit boards having the purpose of insulating the measured building element position from heat arising from the electronics of the top printed circuit board and heat transferred from the surrounding environment.

FIG. 4B represents a frontal view (as seen from the direction of the construction element 30) of the device 20 showing the structure consisting of side arm 21 for a reference temperature sensor 22B detecting steady state temperature in the vicinity of the instrument, another temperature sensor 22A in the middle of the main body of the device 20 measuring the combined temperature of instrument and building element under the instrument and the heating element 24 facing the measured building element. The thermal contact pads and their respective support elements are not illustrated in FIG. 4B.

Figure 5:
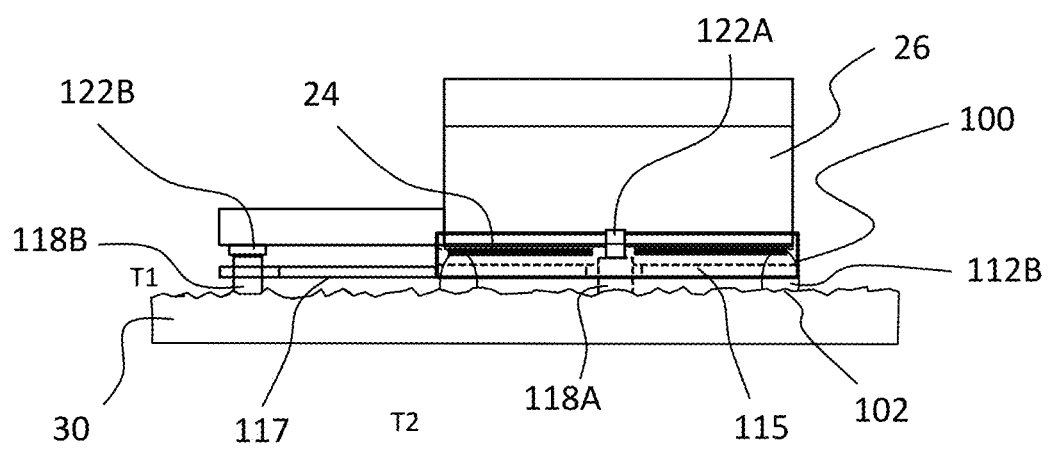
FIG. 5 depicts a heat flow measurement device equipped with an adapter according to some aspects of the invention, placed towards a construction.

FIG. 5 shows a measurement device provided with an adapter 100 of the present kind, placed against a rough construction element 30 such that the front edge 102 of the adapter 100 has adapted to irregularities of the element 30 to prevent airflow to or from the measurement zone. The first thermal contact pad is denoted with numeral 118A and the second one with numeral 118B. Their supporting structures are respectively denoted with numerals 115 and 117.

The rim of the adapter 100 is centering the position of thermal contact pads 118A, 118B. The seal 112B on the edges of the adapter are compressed according to the surface topology and distance defined by the thermal contact pads. Supporting structures 115, 117 of the thermal contact pads 118A, 118B are thinner than the thermal contact pads 118A, 118B and thus not necessarily touching the body of the device or the construction element 30.

Next, the exemplary measurement device and heat flow measurement principle are described in detail. For even more details, we refer to WO 2013/153251.

The aim in the measurement is to determine the amount of heat flow J through a construction 30. The construction, which can consist of, instead of the vertical wall in the figure, also a horizontal or inclined surface, for instance a ceiling or a floor in a building, or a separate, for instance, single board or a wall, ceiling or floor element, comprises a first surface which is in contact with the air on the inside, and a second surface which is in contact with the outside air. T1 is the normal temperature of the wall surface and T2 is the outside air temperature.

In one embodiment, the device comprises a body having a frontside, which is at least essentially planar and which is arranged to be placed towards the surface of a construction.

A first temperature sensor 122A is arranged inside the body such that it is essentially covered by the insulating layer. There is also a heating element 24, which is arranged on the outside, inside or within the body such that the heating element 24 is also essentially covered by the insulating layer 26. A second temperature sensor 122B is arranged at a distance from the first temperature sensor 122A and from the insulating layer 26. By this setup, the surface temperature of the construction 30 sensed by the first temperature sensor 122A is more influenced by the heat flow through the construction 30 than the surface temperature of the construction 30 at the location of the second temperature sensor 122B. The first temperature sensor 122A, which is located under the insulator 26, together with the heating element 24, will be insulated from the air of the room, and, in the case of cold outdoor air, becomes colder compared with the reference temperature sensor 122B, which is located at the side of the instrument on the construction 30.

The body of the measurement device, and consequently the rim of the adapter 100 can be essentially square, rectangular or circular in its lateral cross-section.

The device is pressed towards the surface of the construction 30, such as wall, until the seal 112B is compressed such that it lies tightly against the surface and the thermal contact zones 118A, 118B are in tight contact with both the temperature sensors 122A, 122B, respectively, and the surface. The heating element 24 also comes close to the construction 30.

Due to the elastic seal 112B of the adapter 100, whose front edge 102 contacts the rough surface and adapts in shape accordingly when pressed against the surface, the device sits comfortably against the surface.

An appropriate area of the measurement head, in particular the heating element 24, is approximately 10-1000 cm$^2$, preferably approximately 20-500 cm$^2$, typically approximately 30-250 cm$^2$. According to one embodiment, the area of the measurement head is approximately 100 cm$^2$±20%.

The adapter 100 correspondingly has a footprint that is slightly larger, typically 1-30% larger, in particular 1-20% larger, than the outer footprint of the heating element 24. Thus, the heating element 24 remains inside the rim of the adapter 100.

The first sensor 122A is arranged on the inside of the measurement head and the second sensor 122B is attached to the body via a suitable lateral extension element. Typically, the distance between the sensors is approximately 10-150 mm, preferably approximately 15-100 mm. The second sensor may be spring loaded, for it to be pressed against the surface at the same time the body of the device is pressed against it.

Preferably, the heating element 24 comprises a pattern of thermal resistor wire, which covers a substantial part, such as 80-100%, of the measurement head in the lateral dimensions.

There is a temperature difference between the first surface and the second surface when the temperature of the outside air (on the cold side) and the temperature of the inside (the warm side) differ from each other. Thus, the temperature T1 at the first surface differs from the temperature T2 at the second surface; in the present case T1>T2. Hence, a temperature difference arises across the construction.

It should be noted that it is not necessary to measure the temperature T2, instead, the measurement process which is described below, is focused on the surface temperature T1 on the inside of the construction. However, when the U-value is calculated, data about the temperature of the warm side (not to be confused with the surface temperature of the inner wall) and of the outer air is also required.

The measurement is carried out so that at least two temperature sensors 122A and 122B are first attached against the first surface, and at least one of the temperature sensors, 122A is insulated thermally from a second temperature sensor 122B, in such a way that the temperature T1', which is sensed by the thermally insulated sensor 122A, is affected by the heat flow through the construction 30 more than the temperature T1", which is sensed by the second temperature sensor 122B.

T" should ideally be totally independent of the heat flow through the construction 30. 122B shall therefore only measure the surface temperature of the inner wall, which temperature should in a stationary state be constant because the heat flow from the room to the surface of the inner wall is equal to the heat flow from the inner wall surface to the outer wall surface.

After the device is attached to the wall surface the measurement starts. The temperature difference T1"–T1' between the sensor 122B, and the thermally insulated sensor 122A is determined.

The temperature T1' begins to decrease, if the temperature on the outer side is lower than on the inside, or rise, if the temperature on the outer side is higher than on the inside while T1" is more or less unchanged. From this it follows that the absolute value of the temperature difference T1"–T1' changes (i.e. becomes different from 0).

Following this, the heating element is switched on to heat the wall against which the temperature sensor 122A is attached. The heating element supplies heat until the same temperature is reached as the reference temperature, i.e. the moment when the temperature difference is as close as possible to zero. When a stable state is reached, it is assumed that all power supplied is led out through the wall. Thus it is possible to determine the U-value of the wall by considering the input power, the surface area ($m^2$) which is covered by the instrument, i.e. the insulation, and the temperature difference between the hot side (inside air) and the cold side (outside air).

Based on the above, in one embodiment, the adapter comprises first thermal contact pad arranged inside the rim and supported by the rim by one or more first support members and/or the first thermal contact pad is spanned inside the rim by two or more, such as four, first support members. In a device comprising an adapter of that kind the first thermal contact pad is typically aligned with the first temperature sensor such that the first temperature sensor is thermally contacted with the surface to be measured through the first thermal contact pad when the measurement head is pressed against the surface and the rim of the adapter is compressed and therefore creating air tight space.

In one embodiment, the adapter comprises a second thermal contact pad arranged outside the rim and supported by the rim by one more second support members. In a device having measurement device with a second temperature sensor arranged outside the measurement head and comprising an adapter of the above kind, the second thermal contact pad is typically aligned with the second temperature sensor such that the second temperature sensor is thermally contacted with the surface to be measured through the second thermal contact pad when the measurement head is pressed against the surface and the adapter is compressed.

Only some exemplary device implementations and measurement methods are described in detail above. The present adapter can be used to improve the measurement accuracy of many kinds of devices and measurement methods.

LIST OF REFERENCE NUMBERS

10A, 10B, 100 Adapter
11 Support member
12 Rim
12A Collar
12B Seal
13, 102 Front edge of adapter
15A-D, 115 First support member
16A First thermal contact pad
18A, 118A First thermal contact bridge
20 Measurement head
17, 17A-B, 117 Second support member
16B Second thermal contact pad
18B, 118B Second thermal contact bridge
19A-B Part of thermal contact bridge
22A, 122A First temperature sensor
22B, 122B Second temperature sensor
24 Heating element
26 Insulator
28 Measurement zone
30 Construction element
T1 First temperature
T2 Second temperature

CITATIONS LIST

Patent Literature

WO 2013/153251
DE 27 24 846
JPH 05332851
CN 2476020Y

The invention claimed is:

1. An adapter for fitting a measurement head of a heat flux measurement device on a surface, the adapter comprising:
   a rim positionable around the measurement head of the heat flux measurement device, wherein the rim is at least partly made of resilient material capable of adapting in shape to uneven surfaces for thermally insulating the measurement head from its surroundings
   a thermal contact pad arranged outside the rim and supported by the rim by one more second support members.

2. The adapter according to claim 1, wherein the rim comprises:
   a collar made of first material and having an inner surface adapted to face essentially towards the measurement head, and an outer surface adapted to face away from the measurement head, and
   a seal made of second, resilient material and arranged at least partly on the inner surface of the collar.

3. The adapter according to claim 2, wherein:
   the collar is made of non-porous rigid or resilient material, and
   the seal is made of porous resilient material.

4. The adapter according to claim 3, wherein the collar is made of plastic or silicone and the seal is made of foam plastic or foam rubber.

5. The adapter according to claim 2, wherein:
   the collar is at least partly located on the lateral sides of the seal wherein the collar can be mounted at least partly on the lateral sides of the measurement head, and
   the seal is at least partly located on the front side of the measurement head.

6. The adapter according to claim 1, wherein the rim forms a closed loop having a lateral width of 3 cm or less.

7. The adapter according to claim 1, further comprising a first thermal contact pad arranged inside the rim and supported by the rim by one or more first support members.

8. The adapter according to claim 7, wherein:
   the at least one first support member, and/or the at least one second support member form a unitary piece with at least part of the rim.

9. The adapter according to claim 7, wherein the first contact pad, comprises a thermal bridge mounted thereto, the thermal bridge being made of material having a higher thermal conductivity than the material of the first contact pad it is mounted to.

10. The adapter according to claim 9, wherein the thermal bridge is made of elastic material comprising mixed therein an additive which increases thermal conductivity of the material.

11. The adapter according to claim 10, wherein the additive is metal oxide.

12. The adapter according to claim 7, wherein that apart from the support members and the contact pad, the adapter is open in the measurement zone defined by the rim.

13. The adapter according to claim 7, wherein the first contact pad and second contact pad comprise a thermal bridge mounted thereto, the thermal bridge being made of material having a higher thermal conductivity than the material of the first and second contact pad it is mounted to.

14. The adapter according to claim 1, wherein a first thermal contact pad is spanned inside the rim by two or more first support members.

15. The adapter according to claim 1, wherein a first thermal contact pad is spanned inside the rim by four first support members.

16. A heat flow measurement device for measuring heat flow through a surface, the device comprising:
    a measurement head having a first temperature sensor for measuring the temperature of the surface and a heat transfer element for transferring heat to or from the surface, and
    an adapter according to claim 1 arranged essentially around the measurement head such that when the measurement head is pressed against the surface, the rim of the adapter adapts to the shape of the surface and seals a measurement zone between the measurement head and the surface.

17. The device according to claim 16, wherein:
the adapter comprises a first thermal contact pad, and
the first thermal contact pad is aligned with the first temperature sensor such that the first temperature sensor is thermally contacted with the surface to be measured through the first thermal contact pad when the measurement head is pressed against the surface and the rim of the adapter is compressed.

18. The device according to claim 16, wherein:
the measurement device comprises a second temperature sensor arranged outside the measurement head, and
the thermal contact pad is aligned with the second temperature sensor such that the second temperature sensor is thermally contacted with the surface to be measured through the thermal contact pad when the measurement head is pressed against the surface and the adapter is compressed.

19. A method for measuring heat flow through a construction having a surface with a surface shape, in particular an uneven surface shape, the method comprising:
    providing a measurement device according to claim 16,
    positioning the measurement head against the surface,
    pressing the measurement head against the surface such that the adapter is at least partly compressed so as to adapt is shape to the shape of the surface for increasing thermal insulation of the measurement head from its surroundings outside the rim,
    providing heat to or from the surface to be measured using the heat transfer element,
    reading temperature values of the surface using the first temperature sensor, and
    determining the heat flow using the temperature values read.

* * * * *